UNITED STATES PATENT OFFICE.

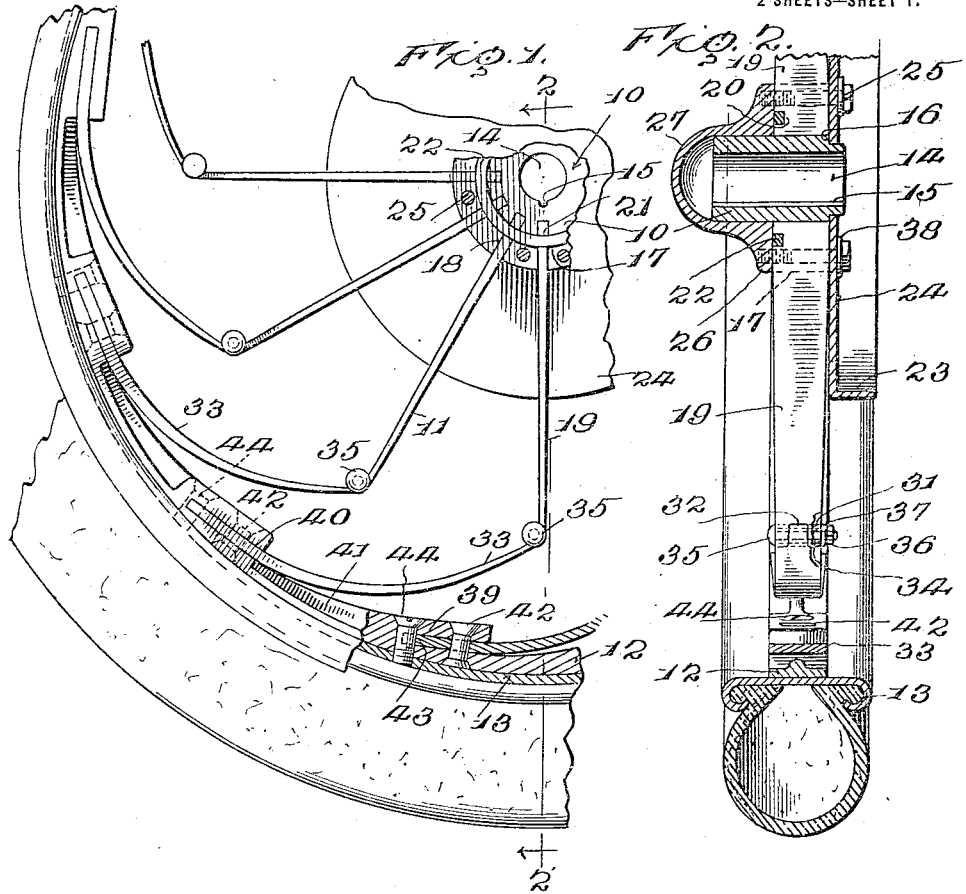
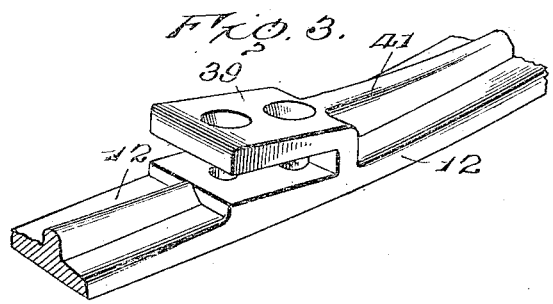

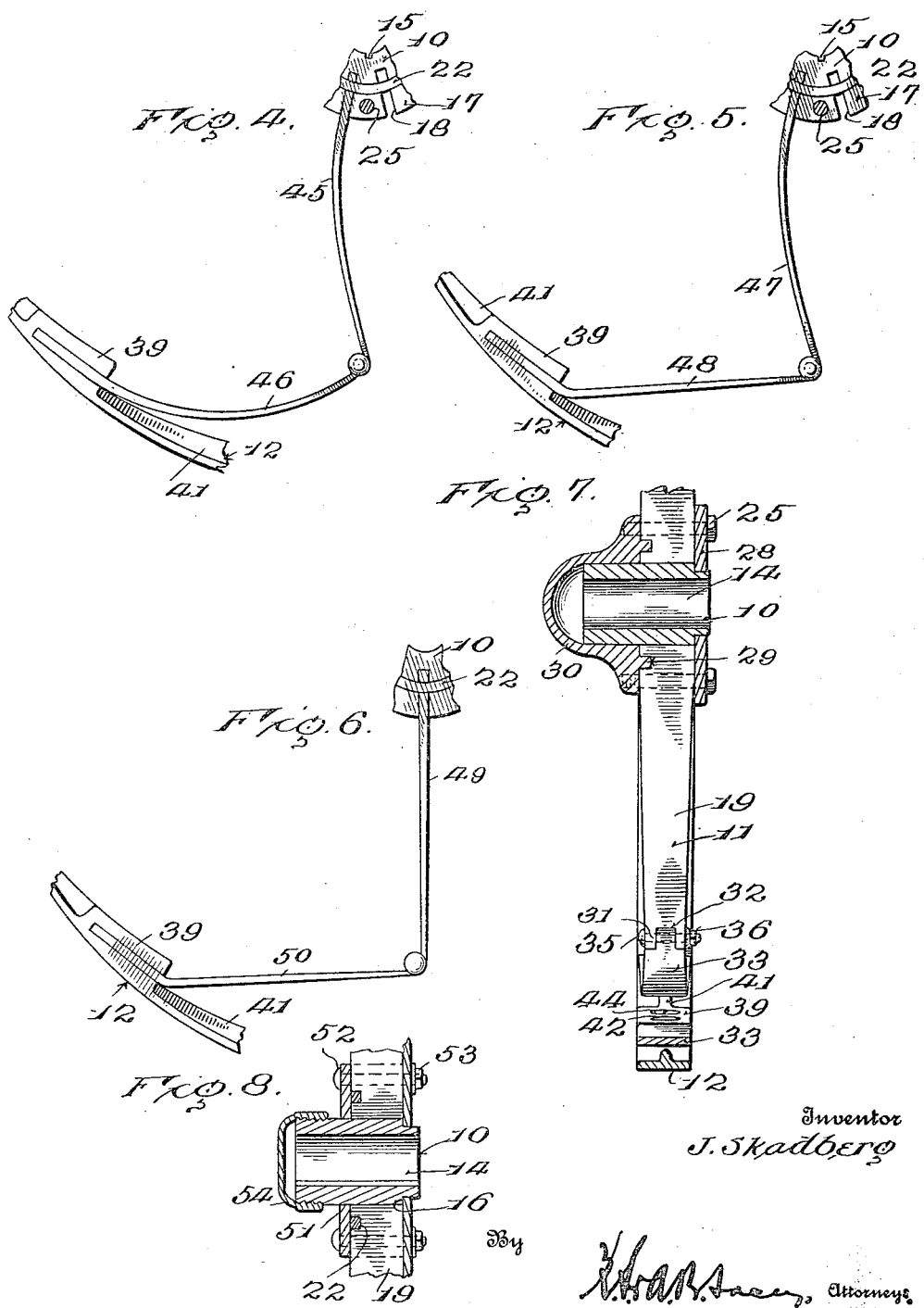

JOHN SKADBERG, OF DULUTH, MINNESOTA.

RESILIENT WHEEL.

1,276,980.             Specification of Letters Patent.     Patented Aug. 27, 1918.

Application filed March 20, 1917. Serial No. 156,122.

*To all whom it may concern:*

Be it known that I, JOHN SKADBERG, a citizen of the United States, residing at Duluth, in the county of St. Louis and State of Minnesota, have invented certain new and useful Improvements in Resilient Wheels, of which the following is a specification.

My invention relates to new and useful improvements in resilient wheels and more particularly to wheels of this character for use upon self-propelled vehicles, the primary object of my invention being the construction of a practically all-steel wheel which will possess maximum strength and resiliency, together with extreme lightness.

A still further object of my invention consists in constructing a wheel having a plurality of compound resilient spokes, each spoke including a pair of springs pivoted to each other and to the hub and felly and all springs being of the cantaliver type.

A still further object which I have in view is the provision of a novel form of hub assembly by means of which a few bolts serve to secure the inner spoke sections, a spoke retaining ring, a brake drum, and a hub cap to each other and to the hub.

Another object which I have in view is the provision of a novel and efficient anchoring means for securing the outer ends of the outer spoke sections to the felly so that they may be held against any movement.

With these and other objects in view, my invention will be more fully described, illustrated in the accompanying drawings, and then specifically pointed out in the claim which is attached to and forms a part of this application.

In the drawings:

Figure 1 is a fragmentary side elevation, partly in section, of a wheel constructed in accordance with my invention;

Fig. 2 is a radial sectional view taken on the line 2—2 of Fig. 1, looking in the direction of the arrows;

Fig. 3 is a fragmentary perspective view of the felly, showing one of the spring receiving seats;

Figs. 4, 5 and 6 are fragmentary diagrammatic elevations, showing modified forms of spoke structure;

Fig. 7 is a view corresponding to Fig. 2, showing a modified form of hub structure.

Fig. 8 is a similar view, showing a further modified form of hub structure.

Corresponding and like parts are referred to in the following description and indicated in all the views of the drawings by the same reference characters.

Broadly speaking, my improved resilient wheel includes as vital elements a hub 10, compound resilient spokes 11, a felly 12 and a rim 13. The hub is substantially cylindrical in shape, being provided with a spindle receiving bore 14 which, in the instance of a rear drive wheel, may be provided with the usual keyway 15. This hub, adjacent one end, is reduced to provide an annular stop shoulder 16 and adjacent this stop shoulder is formed with an annular radially projecting spoke receiving flange 17 equal in width to the width of the inner ends of the spokes. This spoke flange is formed with a plurality of radial spoke receiving slots 18 equally spaced peripherally with their inner ends terminating substantially in the surface of the main body of the hub. The inner spoke sections 19 are in the form of single leaf springs which taper both in width and thickness from the hub engaging ends to their outer ends, as clearly shown in Figs. 1 and 2 of the drawings, and the slots or seats 18 preferably taper in a corresponding manner to snugly receive the ends of the spoke sections 19 to, in themselves, anchor such sections against outward radial movement. In addition to this anchoring, that face of the flange 17 opposite the stop shoulder 16 is formed with an annular channel 20 intersecting the slots and alining with notches 21 formed in the adjacent edges of the inner spoke sections 19 to provide a continuous channel to seat a locking ring 22 which will obviously hold the spoke sections against either inward or outward radial movement, even if they do not fit snugly within their seats.

A brake drum 23 has its body 24 formed with an opening to engage about the reduced end of the hub 10 so that the body of the drum may engage against the stop shoulder 16 and bolts 25 are passed through the body of the brake drum, through openings formed in the hub between the spokes and threaded into the peripheral flange 26 of a dust cap 27. The flange of this dust cap is so proportioned as to extend beyond the locking ring 22 so that it engages both the adjacent edges of the spoke sections and the locking ring. As the brake drum and flange of the hub cap engage against opposite edges of the spokes and against opposite faces of the flange 17 of the hub, it will be clear that the spokes will be held against any lateral movement whatsoever.

In forward wheel construction, the arrangement of parts is the same, with the exception that the hub is not provided with a keyway and that, as shown in Fig. 7, the brake drum is replaced by a clamping ring 28. If desired, either in front or rear wheel construction, the locking ring 22, as a separate element, may be omitted and an annular shoulder 29 may be formed integrally with the flange of an especial hub cap 30. This construction is also shown in Fig. 7 in connection with the clamping ring 28.

The outer end of each inner spoke section 19 is formed to provide alined spaced pintle ears 31 which receive between them a pintle ear 32 formed upon the inner end of the coöperating outer spoke section or spring 33. These ears are formed to receive a bushing 34 and pivot bolts 35 are passed through these bushings and secured by nuts 36. Spring washers 37 are interposed between the nuts and springs to prevent loosening of the nuts. Also, preferably, spring washers 38 are interposed between the heads of the bolts 25 and the brake drum 24 or clamping ring 28, as the case may be. As shown in Figs. 1 and 2, the outer springs or spoke sections 33 taper both in width and thickness from their felly engaging ends to the ends which are pivoted to the inner spoke sections 19. These outer spoke sections are single leaf springs corresponding to the inner spoke sections.

The felly 12 is in the form of a ring or band of metal formed at spaced peripheral intervals with inwardly directed thickened portions or bosses 39 to provide seats for the ends of the outer spoke sections. Each of these thickened portions or bosses is formed throughout its width with a slot or seat proper 40 which opens through the thicker end of the boss and which is disposed at a slight angle to the line of tangency of the felly at that point so that a spoke seated in the slot will have its free end directed inwardly at a slight angle. The slots or seats preferably taper in thickness in conformance to the taper of the spring ends which they receive and the felly is reinforced by medial webs or shoulders 41 extending circumferentially between adjacent bosses, these webs being equal in height at one end to the rear ends of the bosses with which they merge and tapering in height to merge into the outer faces of the seats of the next adjacent bosses so that they may form a support for the outer spoke sections in case of severe distortion of the spoke sections because of imposition of a heavy load upon the vehicle. Each outer spoke section has its ends secured in its felly seat by a rivet 42 passed completely through the felly and seat and through the spring in spaced relation to the outer end of the spring. The outer end of each spring is also formed with a substantially semi-circular notch 43 and a screw or tapped bolt 44 is threaded through the seat, through this notch, through the body of the felly and through the rim 13. These screws or bolts engaging in the notched ends of the outer spring sections coöperate with the rivets to hold the spring sections against any lateral swinging movement and also, inasmuch as they are threaded into or through the rim, serve to connect the rim to the felly. The rim, of course, may be of any desired type capable of receiving any form of solid or pneumatic tire, that shown being of conventional clencher construction.

In the preferred form of my invention, the inner springs or spoke sections 19 are straight throughout their length while the outer spoke sections have their inner portions curved inwardly. The curvature of the outer spoke sections is preferably parabolic and their curves are tangential to the curves of the webs 41 which are arcs of circles having their centers of curvature located on lines at right angles to the inner faces of the bosses or seats 39. However, I do not wish to restrict myself to the specific type of spokes shown in Figs. 1 and 2 of the drawings, as various changes may be made. For instance, both inner and outer spoke sections may be curved, as shown at 45 and 46 in Fig. 4, the inner spoke section may be curved, and the outer spoke section straight, as shown at 47 and 48 in Fig. 5, or both spoke sections may be straight, as shown at 49 and 50 in Fig. 6.

Obviously, a wheel constructed in accordance with this invention may be made almost wholly of high grade steel and, consequently, may be relatively light and still possess all the necessary strength and resiliency.

In Fig. 8 I have illustrated a further modified form of hub structure in which the sole change, over that shown in Fig. 2, consists in providing a clamping ring 51 which will coöperate with the body of the brake drum or with the ring 28, as the case may be, to receive bolts 52 having nuts 53 whereby the spokes and locking ring 22 will be secured in place. This does away with the heavy dust cap 27 and a light dust cap 54 may be threaded directly upon the outer end of the hub 10.

Although I have illustrated and described my invention in all its details of construction, it will of course be understood that I do not wish to limit myself to such details but reserve the right to make any changes, within the scope of the appended claim, without in the slighest degree departing from the spirit of my invention.

Having thus described the invention, what is claimed as new is:

A wheel including a hub and a rim, the rim, having a plurality of sockets extending tangentially thereof and opening laterally and communicating without obstruction with the interior of the wheel, a plurality of resilient spokes extending from the hub, a resilient arm engaging at one end in each of the sockets and with a notch in the socket engaging end, each of said arms being pivoted at the other end to one of the spokes, a fastening device extending through the socket and through the portion of the arm within the socket, and a holding device extending through the socket and engaging within the notch of the arm.

In testimony whereof I affix my signature.

JOHN SKADBERG. [L. S.]

Copies of this patent may be obtained for five cents each, by addressing the "Commissioner of Patents, Washington, D. C."